Dec. 24, 1968    T. HAFNER    3,417,434
GROOVE FORMING TOOL FOR PIPES
Filed Sept. 14, 1966
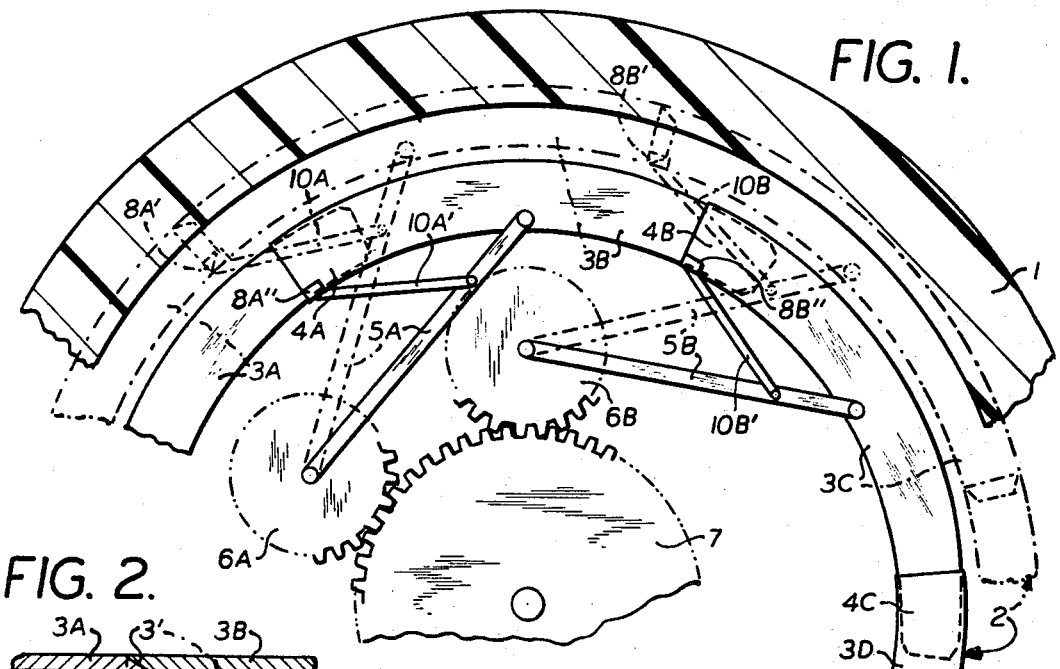
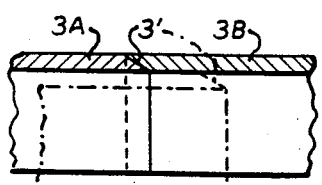
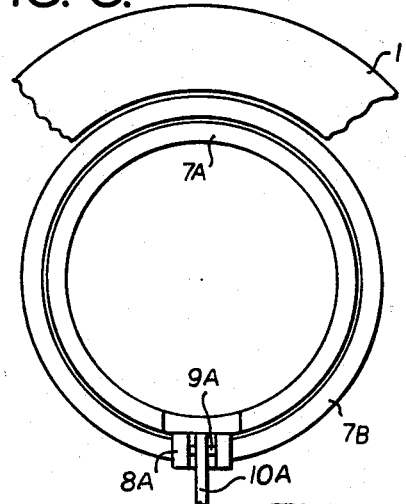
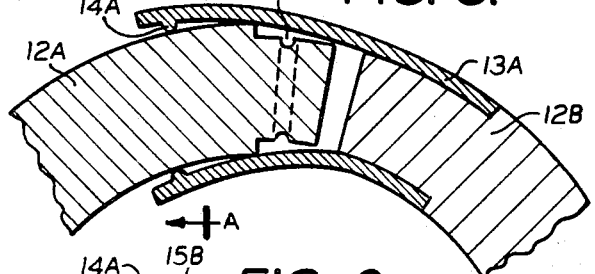
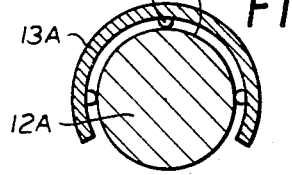
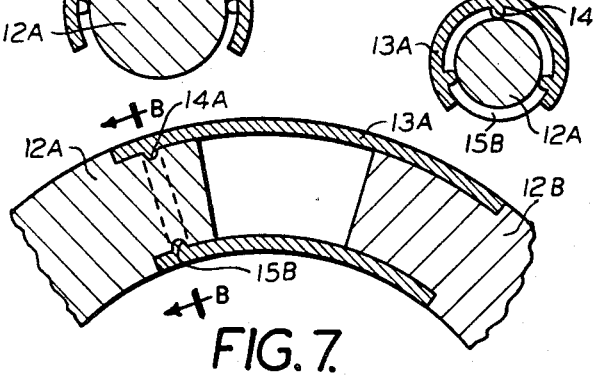
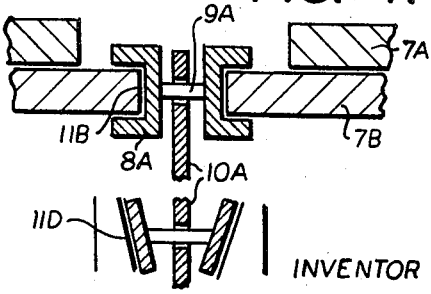
INVENTOR
Theodore Hafner United States Patent Office 3,417,434
Patented Dec. 24, 1968

3,417,434
GROOVE FORMING TOOL FOR PIPES
Theodore Hafner, 1501 Broadway,
New York, N.Y. 10036
Filed Sept. 14, 1966, Ser. No. 579,320
4 Claims. (Cl. 18—45)

ABSTRACT OF THE DISCLOSURE

The invention consists of a forming tool comprising a number of ring-shaped sections adjoining each other and forming a substantially continuous circular configuration of predetermined diameter, and means for telescoping at least part of the ends of the sections, one end moving parallel to an adjacent end, so as to produce a configuration of another predetermined diameter substantially without changing the continuous circular shape of configuration while moving from one diameter to the other.

---

This invention relates to the forming of grooves, especially circular grooves inside a plastic pipe.

One of the objects of the invention is to provide any shaped grooving tool with telescoping sectors which can be easily inserted into the pipe or over which the pipe can be easily slipped on and afterwards expanded to provide the grooves, and which can be contracted again to be removed from the pipe, or permit removal of the pipe therefrom.

A more specific object of the invention is to permit hot pipe to be slipped over such a groove forming tool, to expand the tool peripherally to provide an inner groove of predetermined diameter and depth, and thereafter to cool the pipe so as to permit the groove to be permanently fixed while the tool is still in operative position; after cooling of the pipe and fixation of the groove the tool will be peripherally contracted to permit removal of the tool or the pipe, as the case may be, or insertion of the tool into another pipe, or simply imposition of another pipe, and repetition of the grooving process.

A more specific object of the invention is to provide a tool consisting of a number of tubular, circular sections forming a ring-shaped configuration of predetermined diameter in one position of the tool, and of another diameter in another position of the tool, for example a smaller diameter in an inoperative position of the tool, and larger diameter in an operative position of the tool.

As another object of the invention, the adjoining sections of the ring-shaped configuration are transformed from one diameter into another by causing the adjoining ends of the sections to be slipped in or over each other, thereby permitting the configuration to form a reduced circumference and thus a reduced diameter, and conversely, to be slipped out of and from each other to permit an increased circumference and thereby an increased diameter corresponding to an operative position of the groove forming tool.

These and other objects of the invention will be more fully apparent from the drawings in which FIG. 1 shows a forming tool embodying certain principles of the invention as applied to a plastic pipe.

FIG. 2 shows in cross-section the overlapping of the adjoining tool sections.

FIGS. 3 and 4, the latter in cross-section and at an enlarged scale, show a modification of the invention as shown in FIGS. 1 and 2.

FIGS. 5 and 6 show in cross-sectional front and side views respectively a further modification of the groove forming tool in inoperative position, and FIGS. 7 and 8 show the same modification in cross-sectional front and side views respectively in operative position.

As apparent from FIG. 1, PVC pipe piece 1, in hot condition, is slipped over ring-shaped tool 2, consisting of a number of half round or slotted tubular or at least partially tubular ring sections 3A, 3B, 3C, 3D etc. of springy material, the ends of which are partially slipped into or over each other at portions schematically indicated at 4A, 4B, 4C, etc.

Ring sections 3A, 3B, etc. are attached through pivotable levers 5A, 5B, etc. to tooth wheels 6A, 6B, etc. meshing with a central activating gear 7.

After pipe 1 has been slipped over ring sections 3A, 3B, etc. the same rings 3A, 3B, etc., under control of levers 5A, 5B, etc., gears 6A, 6B, etc. and central gear 7 are moved into the position shown in FIG. 1 in dotted lines, whereby rings 3A, 3B, etc. are slipped with their ends in a direction away from each other arriving in the position indicated in FIG. 1, full line, in which only a small end of each ring section 3A, 3B, etc. remains inserted into, or engaging the ends of the adjoining ring section.

In this position, hot pipe 1 is expanded and provided with a semi-circular groove corresponding to the shape of ring structure 3A, 3B, 3C, etc. Thereafter, tube 1 is cooled and becomes rigid.

In order now to be able to remove tube 1 from the expanded ring structure 3A, 3B, the levers 5A, 5B, etc. under control of gears 6A, 6B, etc. and central gear 7 are moved back into non-operative position drawn in full line.

In this position, the grooved pipe piece may be removed, another hot pipe piece may be placed over the new contracted ring structure 3A, 3B, etc. and the pipe grooving operation can be repeated as before, In order to facilitate the insertion of one tool section end into the adjoining one, the corresponding section ends are provided with conical shapes or other indentations or deformations schematically indicated at 3', fitting into or onto each other, so as to facilitate—enhanced if necessary by appropriate lubrication, the entrance and the sliding movement of one tool section into the adjoining tool section, as schematically indicated in FIG. 2.

FIGS. 3 and 4 show a modification of FIG. 2 in which two adjoining tool sections, sliding into each other, are schematically indicated at 7A and 7B respectively, with the difference that the two tubular ends do not possess substantially the same length of circumference as shown in FIG. 2.

In FIGS. 3 and 4 the inner tube 7B is shown to have a smaller circumference than outer tube 7A and, consequently, any of the succeeding tubes 7C, 7D etc. have each a smaller circumference than the corresponding preceding tube.

This permits a pair of sliding pieces schematically indicated at 8A to be inserted in slot 11B (FIG. 4) of outer tube 7B, which is gradually narrowing down towards its outer end.

Sliding pieces 8A are connected by a shift 9A, which supports a lever 10A, which is operated by gear-operated lever 5A in such a way schematically indicated in FIG. 1, that, when lever 10A is turned downward into its inoperative position 10A, then sliding piece 8A moves from its end position, shown in FIG. 1 schematically indicated at 8A', into its intermediary position 8A'', in which outer tube 7B is slightly spread out, facilitating inner tube 7A slipping into outer tube 7B.

Conversely, if lever 10A is moved upward from inoperative position 10A'' into its operative position 10A', then sliding pieces 8A will move their inoperative end position 8A'' into their operative position 8A', away from the end of outer tube 7B, thereby permitting outer tube 7B under its spring force to grip over inner tube 7A and thereby insuring the rigid interconnection of rings 3A, 3B, 3C, etc. in their operative positions.

The additional arrangement of levers 10A and sliding pieces 8A, while it is important to enhance or release gripping action between the adjoining tube ends of the core, it is not essential for the purpose of the invention which may be modified in any appropriate way whatsoever without departing from the scope of this disclosure.

In the modification shown in FIGS. 5 and 6 the groove forming tool consists substantially not of tubular sections, but of solid sections, consisting for example, as shown in FIG. 5, of spring metal rods 12A, 12B, etc. in accordance with the number of sections used to form the circular tool configuration.

In this case as well as in the embodiments shown in FIGS. 1 to 4 and generally in accordance with the invention, the ring shaped configuration may consist of any desired number of sections.

According to FIG. 5, peripheral slipping, overlapping or telescoping in accordance with the invention is effected by providing at least one end of each of the sections 12A, 12B, etc., with a sleeve schematically indicated indicated at 13A and attached to the end of section 12B by welding, screwing, etc. or in any desired manner without departing from the scope of this invention.

Sleeve 13A, which also consists of springy metal material and is also slotted to provide springiness, not only in a direction perpendicular to its cross-section, but also in a direction parallel thereto, as apparent from FIG. 6, is provided at its outer end with inner projections schematically indicated at 14A, arranged to permit registration of section 12B with respect to section 12A in operative position. In the inoperative position shown in FIG. 5, sleeve 13A with projections 14A is shown to telescope with, or overlap on the end of the adjoining section 12A.

In the inoperative position shown in FIGS. 7 and 8 respectively, sleeve 13A, with projection 14A is shown to register in a corresponding recess or groove, schematically indicated in FIGS. 5 and 7 at 15B, thereby fixing the adjoining sections 12A, 12B in operative position.

While the invention has been illustrated and described with specific projections and recesses for registration of the adjoining sections of the ring shaped tool configuration, it is not limited thereto, but registration may be effected in any other appropriate way without departing from the scope of this disclosure.

I claim:
1. In a groove forming tool for plastic pipe, a ring-shaped structure consisting of a number of adjoining sections having adjoining ends at least one of which is tubular; and means for moving at least some of said sections substantially in peripheral directions, relative in each other to at least partly overlap each other so as to vary said structure, from a diameter which is substantially smaller than the inner diameter of the pipe to another diameter corresponding to the depth of the groove in said pipe, said moving means comprising levers, intermediate gears attached to said levers and a central gear driving said intermediate gears and arranged around an axis perpendicular to the plane of said ring-shaped structure, and coaxially therewith.

2. Molding apparatus consisting of a number of interfitting, at least at one end tubular sections, forming a circular configuration and arranged so that one end of each section fits in the end of the next section, and means for moving the sections telescopic in relation to each other so as to change the diameter of said configuration.

3. Apparatus according to claim 2 wherein one of said sections, at least at one end is tubular, and an adjoining section at the corresponding end is solid and fitting into said tubular end.

4. Apparatus according to claim 2, wherein at least one end of a section is provided with projecting means and an adjoining end of another section is provided with recessed means fitting into said projecting means.

References Cited
UNITED STATES PATENTS

| | | | |
|---|---|---|---|
| 258,122 | 5/1882 | Richardson et al. | 25—128 XR |
| 841,504 | 1/1907 | Georgenson et al. | 249—179 |
| 859,681 | 7/1907 | Morris | 249—179 |
| 860,144 | 7/1907 | Melton | 249—179 |
| 1,270,604 | 6/1918 | Dech | 18—45 |
| 1,279,214 | 9/1918 | Ames | 18—45 |
| 1,698,676 | 1/1929 | Denmire | 18—45 |
| 1,788,428 | 1/1931 | Garabiol | 18—45 |
| 2,447,703 | 8/1948 | Jenkins | 249—100 |
| 2,469,629 | 5/1949 | Boyer | 25—128 XR |
| 3,124,857 | 3/1964 | Delisle | 249—100 |
| 3,201,844 | 8/1965 | Poitras | 25—127 XR |

WILLIAM J. STEPHENSON, *Primary Examiner.*

U.S. Cl. X.R.

18—19; 25—128; 249—178